(12) United States Patent
Kwon et al.

(10) Patent No.: US 10,508,970 B2
(45) Date of Patent: Dec. 17, 2019

(54) SYSTEM FOR PRECISION MEASUREMENT OF STRUCTURE AND METHOD THEREFOR

(71) Applicants: POONGSAN FNS CORPORATION, Nonsan-si (KR); Korea Advanced Institute of Science and Technology, Daejeon (KR)

(72) Inventors: Nam-Yeol Kwon, Daejeon (KR); Doo-Young Kang, Daejeon (KR); Seung-Beom Park, Cheongju-si (KR); Min-Jae Kim, Daejeon (KR); Jae-Min Moon, Daejeon (KR); Hyeon-Muk Lim, Nonsan-si (KR); Jin-Seok Kang, Nonsan-si (KR); Hoon Sohn, Daejeon (KR); Ki-Young Kim, Daejeon (KR); Gun-Hee Koo, Daejeon (KR); Jae-Muk Choi, Daejeon (KR); Jun-Yeon Chung, Daejeon (KR)

(73) Assignees: POONGSAN FNS CORPORATION, Nonsan-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/475,701

(22) PCT Filed: Jan. 29, 2018

(86) PCT No.: PCT/KR2018/001227
§ 371 (c)(1),
(2) Date: Jul. 3, 2019

(87) PCT Pub. No.: WO2018/143625
PCT Pub. Date: Aug. 9, 2018

(65) Prior Publication Data
US 2019/0346339 A1 Nov. 14, 2019

(30) Foreign Application Priority Data
Feb. 6, 2017 (KR) .................. 10-2017-0016270

(51) Int. Cl.
*G01M 5/00* (2006.01)

(52) U.S. Cl.
CPC ........ *G01M 5/0075* (2013.01); *G01M 5/0066* (2013.01)

(58) Field of Classification Search
None
See application file for complete search history.

(56) References Cited

U.S. PATENT DOCUMENTS 6,208,937 B1 * 3/2001 Huddle ............... G01C 21/165
342/357.22
9,796,089 B2 * 10/2017 Lawrence, III ........ G01B 11/24
(Continued)

FOREIGN PATENT DOCUMENTS

| JP | 2005-062083 A | 3/2005 |
|---|---|---|
| KR | 10-2008-0091664 A | 10/2008 |
| KR | 10-2009-0122658 A | 12/2009 |

OTHER PUBLICATIONS

Han et al., "Feasibility Study of Structural Behavior Monitoring Using GPS and Accelerometer;" English Abstract Only; Journal of the Korea Institute for Structural Maintenance and Inspection, vol. 16, No. 3; May 2012; pp. 11-22; 12 Pages.
Kim et al., "Effect of Sampling Frequency of GPS Relative Positioning Method on Measurement for Accuracy Evaluation;" English Abstract Only; Proceedings of the Architectural Institute of Korea Conference, vol. 30, No. 1; Oct. 2010; pp. 115-116; 2 Pages.
International Search Report dated Apr. 26, 2018 for International Application No. PCT/KR2018/001227; 4 Pages.

*Primary Examiner* — Natalie Huls
*Assistant Examiner* — Jermaine L Jenkins
(74) *Attorney, Agent, or Firm* — Daly Crowley Mofford & Durkee, LLP

(57) ABSTRACT

Disclosed are a system and a method for precisely measuring a structure are disclosed. A reference meter installed at a fixed location provides GPS reference information. A (Continued)

plurality of response meters, respectively installed at a plurality of positions of the structure, acquire acceleration information through acceleration sensors and measure a plurality of real-time kinematic (RTK) displacement data based on the GPS reference information, respectively. The response meters synchronize acceleration information with the plurality of RTK displacement data measured to generate into a packet to be transmitted. An operation processor receives the acceleration information and the plurality of RTK displacement data and calculates structure response information. With the GPS and accelerometers, the dynamic behaviors of structures including high-rise buildings, bridges, dams, and harbors can be precisely measured.

18 Claims, 9 Drawing Sheets

(56) References Cited

U.S. PATENT DOCUMENTS

| | | | |
|---|---|---|---|
| 10,139,308 B2 * | 11/2018 | Kobayashi | G01M 5/0008 |
| 10,309,786 B2 * | 6/2019 | Hamilton | G01S 19/14 |
| 2006/0181700 A1 * | 8/2006 | Andrews | G01N 21/21 |
| | | | 356/237.2 |
| 2014/0249750 A1 * | 9/2014 | Hamilton | G01C 21/165 |
| | | | 701/469 |
| 2014/0316708 A1 * | 10/2014 | Mollineaux | G01M 5/0033 |
| | | | 702/15 |
| 2018/0196014 A1 * | 7/2018 | Mann, III | G01N 29/4418 |

\* cited by examiner

FIG. 8

| GPS MEASUREMENT DISPLACEMENT | MEASUREMENT ACCELERATION | KALMAN FILTERING RESULT | GPS RELATED INFORMATION | STORAGE RELATED SETTINGS |
|---|---|---|---|---|

SENSOR ID #1

| NUMBER OF GPS SATELLITES | 8 |
|---|---|
| MODE INFORMATION | fixed |
| INTEGER AMBIGUITY NUMBER INFORMATION | 3 |

SENSOR ID #2

| NUMBER OF GPS SATELLITES | 7 |
|---|---|
| MODE INFORMATION | fixed |
| INTEGER AMBIGUITY NUMBER INFORMATION | 1 |

SENSOR ID #3

| NUMBER OF GPS SATELLITES | 8 |
|---|---|
| MODE INFORMATION | float |
| INTEGER AMBIGUITY NUMBER INFORMATION | 15 |

...

SENSOR ID #10

| NUMBER OF GPS SATELLITES | 9 |
|---|---|
| MODE INFORMATION | float |
| INTEGER AMBIGUITY NUMBER INFORMATION | 1 |

FIG. 9

| GPS MEASUREMENT DISPLACEMENT | MEASUREMENT ACCELERATION | KALMAN FILTERING DISPLACEMENT | GPS RELATED INFORMATION | STORAGE RELATED SETTINGS |
|---|---|---|---|---|
| SENSOR ID #1 | | | | |
| FILE STORAGE PATH | | | | D:\SAVE_FILE |
| SAVE(TRUE/FALSE) | | | | TRUE |
| SENSOR ID #2 | | | | |
| FILE STORAGE PATH | | | | D:\SAVE_FILE |
| SAVE(TRUE/FALSE) | | | | FALSE |
| ... | | | | |
| SENSOR ID #10 | | | | |
| FILE STORAGE PATH | | | | D:\SAVE_FILE |
| SAVE(TRUE/FALSE) | | | | TRUE |

SYSTEM FOR PRECISION MEASUREMENT OF STRUCTURE AND METHOD THEREFOR

CROSS-REFERENCE TO RELATED APPLICATION

This application is a U.S. National Stage of PCT/KR2018/001227 filed in the Korean language on Jan. 29, 2018, entitled "SYSTEM FOR PRECISION MEASUREMENT OF STRUCTURE AND METHOD THEREFOR," which application claims the priority benefit of Korean Patent Application No. 10-2017-0016270 filed on Feb. 6, 2017 in the Korean Intellectual Property Office, the disclosure of which is incorporated herein by reference.

BACKGROUND

1. Technical Field

The present disclosure relates to a system and method for accurately measuring a dynamic behavior of a structure such as high-rise buildings, bridges, dams, harbors, and the like using a global positioning system (GPS) and an accelerometer.

2. Discussion of the Related Art

As is well known, the GPS is a global positioning system using satellites that was developed by the U.S. Department of Defense and has been managed jointly with the U.S. Department of Transportation. The GPS positioning principle is that a GPS receiver, which includes a GPS antenna, at an observation point receives radio waves from the GPS satellites of which exact locations are known from the tracked trajectories, and a spatial position of the GPS receiver is obtained by measuring an arrival time of the radio wave from each of the GPS satellites to the GPS receiver.

Here, the most important factor determining the distance from the GPS receiver to the GPS satellites is time. If the time counted by a clock on the GPS satellite precisely matches time counted by a clock on the GPS receiver, a three-dimensional (X, Y, Z) position of the GPS receiver can be calculated only by the distances from three GPS satellites.

This GPS position measurement principle is used in various fields of society. Especially, the GPS receiver may be installed in structures such as high-rise buildings, bridges, dams and harbors, and can be used to continuously and precisely monitor behaviors or states of the structures. Through this, it is possible to check the condition of the sites and structures, predict possibility of destruction, evaluate conditions of the sites and structures, and prevent disasters by collapse.

As a geodetic surveying method using the GPS for structures including high-rise buildings, bridges, dams, harbors, etc., a static positioning method for obtaining an absolute coordinate of a position to be measured is known. In this regard, a kinematic positioning method is generally used to monitor dynamic behaviors of the structure. In the static positioning for a structure, it is assumed that the point where the GPS antenna is attached does not move or that even if the movement occurs, the required positioning precision is low so that the displacement can be ignored. When kinematic positioning is performed on a structural measurement point, it is necessary to measure the displacement due to vibration or dynamic load at the point where the GPS antenna is attached and to process the measurement result.

As described above, various studies have been conducted to precisely measure the dynamic behavior of structures such as high-rise buildings, bridges, dams, harbors, and the like. Examples of prior art related to this are Korean Patent Application Publication No. 10-2004-0030772 (published on Apr. 9, 2004) and Korean Patent Publication No. 10-1395695 (registered May 9, 2014).

SUMMARY

The present disclosure is to provide a method for accurately measuring dynamic behaviors of structures including high-rise buildings, bridges, dams, harbors, and the like using the GPS and an accelerometer, and a system therefor.

The present disclosure also provides a precise structure-measurement system which is installed at a fixed position and capable of precisely measuring dynamic characteristics of a structure including acceleration, velocity, displacement, angular displacement, etc., of the structure and a precise measurement method for the structure using the precise structure-measurement system.

In addition, the present disclosure is to provide a precise structure-measurement system and method that can be a solution for time synchronization, integration and compatibility of data by measuring six degrees of freedom (DOF) dynamic characteristics of a structure including acceleration, velocity, displacement, angular displacement, and the like, that can respond to low vibration of several micro G or less in a low frequency response characteristics of the structure, and that can measure at any time a change of the structure due to a temperature change depending on presence or absence of wind, sunlight and the like.

The objects of the embodiments of the present disclosure are not limited to the above-mentioned objects, and other objects not mentioned can be clearly understood by those skilled in the art from the following descriptions.

A system for precisely measuring a structure according to embodiments of the present disclosure includes a reference meter, a plurality of response meters, and an operation processor. The reference meter is installed at a fixed position and configured provide GPS reference information received via a reference GPS module. The plurality of response meters, respectively installed at a plurality of positions of the structure, each of which includes an acceleration sensor and a response GPS module and is configured to synchronize acceleration information obtained through the acceleration sensor with a plurality of real-time kinematic (RTK) displacement data measured through the response GPS module using the GPS reference information to transmit the synchronized acceleration information and the plurality of RTK displacement data. The operation processor is configured to calculate structure response information using the transmitted acceleration information and the plurality of RTK displacement data.

The GPS reference information may include reference position data and reference time data. The plurality of RTK displacement data may include dynamic displacement data corresponding to X-axis, Y-axis, and Z-axis and displacement time data. The response meter may acquire the acceleration information by measuring an X-axis component, a Y-axis component, and a Z-axis component of an acceleration of the structure through the acceleration sensor. The response meter may synchronize acceleration time data corresponding to the acceleration information with the displacement time data at multi-sampling frequencies to generate the acceleration information and the plurality of RTK displacement data into a packet. The acceleration information may include acceleration data corresponding to an X-axis, a Y-axis, and a Z-axis, and angular displacement data corresponding to an XY plane, a YZ plane, and a ZX plane.

In an exemplary embodiment of the present disclosure, the response meter may be configured to acquire the plurality of RTK displacement data corresponding to installation positions using satellite signals and the GPS reference information which are received from the plurality of satellites via the response GPS module.

In an exemplary embodiment of the present disclosure, the response meter may be configured to measure three-axis relative displacements of the satellite signals based on the GPS reference information and assign corresponding displacement time information to respective relative displacement data.

In an exemplary embodiment of the present disclosure, the response meter may be configured to assign corresponding acceleration time information to the acceleration information based on the GPS reference information.

In an exemplary embodiment of the present disclosure, the response meter may be configured to perform correction of the acceleration information In temperature change based on temperature data measured by a temperature sensor that senses a temperature inside the response meter.

In an exemplary embodiment of the present disclosure, the operation processor may be configured to calculate a three-DOF acceleration and a three-DOF angular displacement of the acceleration information and a three-DOF dynamic displacement of the RTK displacement data using a first-stage Kalman filter and a second-stage Kalman filter so that a displacement error corresponding to an acceleration-internal bias is eliminated.

In an exemplary embodiment of the present disclosure, the operation processor may be configured to calculate a first displacement including the acceleration-internal bias through the first-stage Kalman filter.

In an exemplary embodiment of the present disclosure, the calculation processor may be configured to calculate the displacement error included in the first displacement through the second-stage Kalman filter, and then remove the displacement error from the first displacement to calculate the structure response information.

In an exemplary embodiment of the present disclosure, the operation processor may be configured to comparatively display the acceleration information, the plurality of RTK displacement data, and the structure response information.

A method for precisely measuring a structure according to embodiments of the present disclosure includes: providing GPS reference information by a reference meter installed at a fixed position; acquiring acceleration information from an acceleration sensor by a plurality of response meters respectively installed at a plurality positions of the structure; measuring a plurality of RTK displacement data based on the GPS reference information by the plurality of response meters, respectively; synchronizing the acceleration information and the plurality of RTK displacement data to transmit the synchronized acceleration information and RTK displacement data by the plurality of response meters; and receiving the acceleration information and the plurality of RTK displacement data and calculating structure response information by an operation processor.

The GPS reference information may include reference position data and reference time data, and the plurality of RTK displacement data may include dynamic displacement data corresponding to X-axis, Y-axis, and Z-axis and displacement time data.

In the step of acquiring acceleration information, the acceleration information may be acquired by measuring an X-axis component, a Y-axis component, and a Z-axis component of an acceleration of the structure through the acceleration sensor, where the acceleration information may include acceleration data corresponding to an X-axis, a Y-axis, and a Z-axis, and angular displacement data corresponding to an XY plane, a YZ plane, and a ZX plane.

In the step of synchronizing the acceleration information and the plurality of RTK displacement data, the acceleration time data corresponding to the acceleration information may be synchronized with the displacement time data at multi-sampling frequencies to generate the acceleration information and the plurality of RTK displacement data into a packet.

In an exemplary embodiment of the present disclosure, in measuring the plurality of RTK displacement data, the plurality of RTK displacement data corresponding to installation positions may be acquired using satellite signals and the GPS reference information which are received from the plurality of satellites via the response GPS module.

In an exemplary embodiment of the present disclosure, in measuring the plurality of RTK displacement data, three-axis relative displacements of the satellite signals may be measured based on the GPS reference information and corresponding displacement time information may be assigned to respective relative displacement data.

In an exemplary embodiment of the present disclosure, in acquiring acceleration information, corresponding acceleration time information may be assigned to the acceleration information based on the GPS reference information.

In an exemplary embodiment of the present disclosure, in synchronizing the acceleration information and the plurality of RTK displacement data, correction of the acceleration information may be performed according to temperature change based on temperature data measured by a temperature sensor that senses a temperature inside the response meter, and then the time data may be included into the packet to be transmitted.

In an exemplary embodiment of the present disclosure, in calculating the structure response information, a three-DOF acceleration and a three-DOF angular displacement of the acceleration information, and a three-DOF dynamic displacement of the RTK displacement data may be calculated using a first-stage Kalman filter and a second-stage Kalman filter so that a displacement error corresponding to an acceleration-internal bias can be eliminated.

In an exemplary embodiment of the present disclosure, in calculating the structure response information, a first displacement including the acceleration-internal bias may be calculated through the first-stage Kalman filter.

In an exemplary embodiment of the present disclosure, in calculating the structure response information, the displacement error included in the first displacement may be calculated through the second-stage Kalman filter, and then the displacement error may be removed from the first displacement to calculate the structure response information.

In an exemplary embodiment of the present disclosure, the method may further including comparatively displaying the acceleration information, the plurality of RTK displacement data, and the structure response information after calculating the structure response information.

The present disclosure can provide a system and method for precisely measuring dynamic behaviors of a structure such as high-rise buildings, bridges, dams, and harbors using GPS and an accelerometer.

Also, the system according to the present disclosure includes the reference meter installed at a fixed location and configured to provide the GPS reference information, the plurality of response meters installed respectively at a plurality of positions on the structure and configured to measure the displacement information corresponding to the installation position; and the operation processor configured to respectively receive the displacement information from the plurality of response meters via the communication network and calculate the structure response information, thereby precisely measuring the dynamic characteristics of the structure including acceleration, velocity, displacement, angular displacement, etc.

In addition, the present disclosure can provide solutions for the synchronization, integration, and compatibility of data by measuring the six DOF dynamic characteristics of the structure including acceleration, velocity, displacement, angular displacement, etc. The system according to the present disclosure may not only respond to the low vibration of several micro Gs in the low frequency response characteristics of the structure but also constantly measure the change due to the temperature change depending on presence or absence of wind, sunlight, and the like.

BRIEF DESCRIPTION OF THE DRAWINGS

FIGS. 4 to 9 are diagrams for describing an operation processor included in the precise measurement system of a structure according to an embodiment of the present disclosure.

DETAILED DESCRIPTION OF THE EMBODIMENTS

Figure 1:
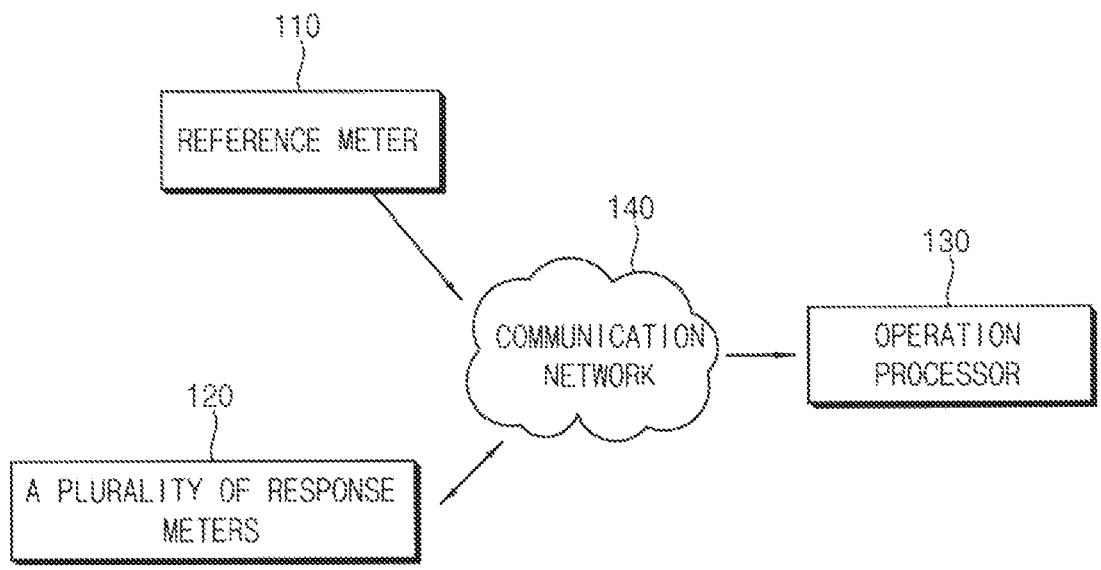
FIGS. 1 to 3 illustrate a precise measurement system of a structure according to an embodiment of the present disclosure.

Advantages and features of embodiments of the present disclosure and methods of achieving them will be apparent with reference to the embodiments described in detail below along with the accompanying drawings. The present disclosure may, however, be embodied in many different forms and should not be construed as limited to the embodiments set forth herein. These embodiments are provided so that the disclosure of the present disclosure is complete and that those skilled in the art will fully understand the scope of the present disclosure. The invention is only defined by the scope of the claims. Like reference numerals refer to like elements throughout the specification.

In the following description of the embodiments of the present disclosure, detailed descriptions of known functions and configurations incorporated herein will be omitted when it may make the subject matter of the present disclosure rather unclear. The following terms are defined in consideration of the functions of the embodiments of the present disclosure and may vary depending on the intention of the user, the operator, or the customs. Therefore, the definition should be based on the contents throughout this specification.

Hereinafter, embodiments of the present disclosure will be described in detail with reference to the accompanying drawings.

Figure 2:
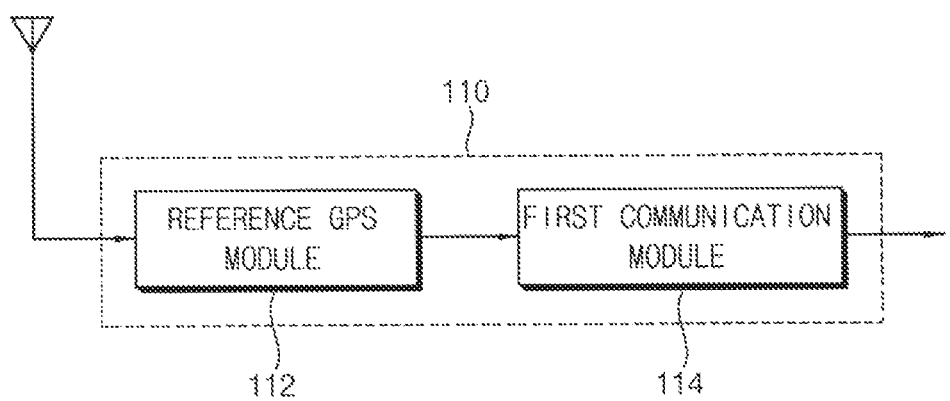
Figure 3:
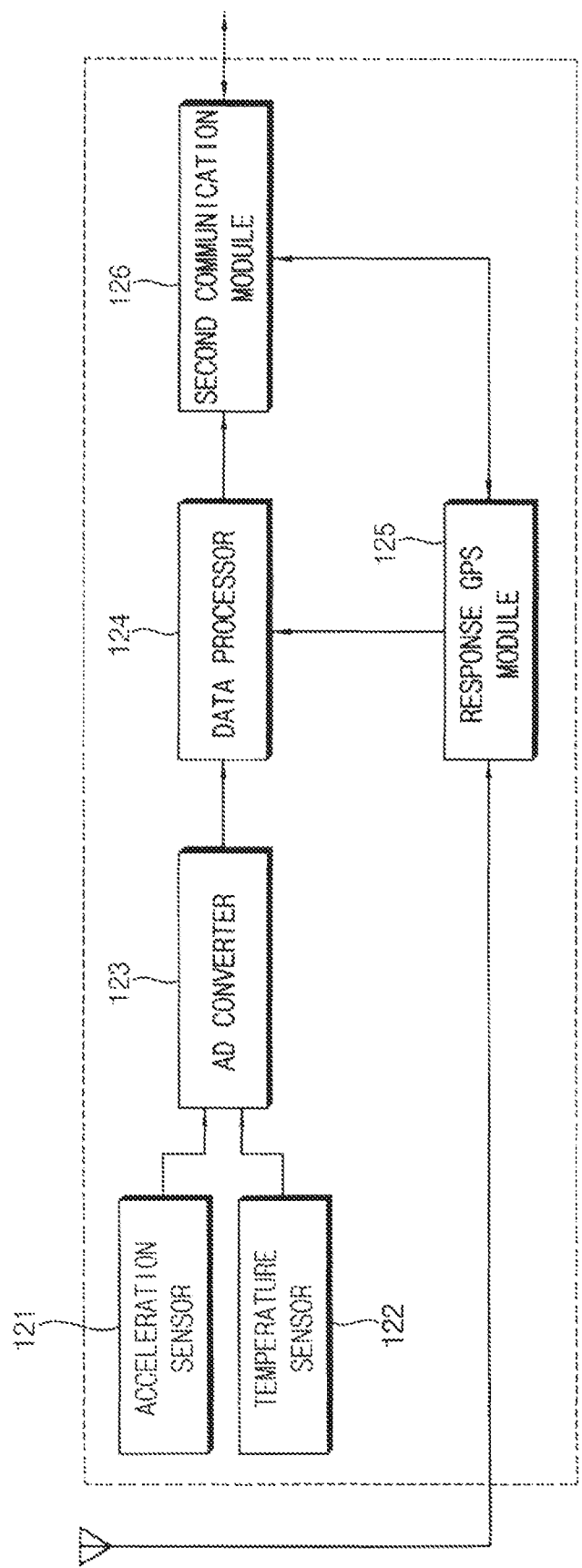
Figure 4:
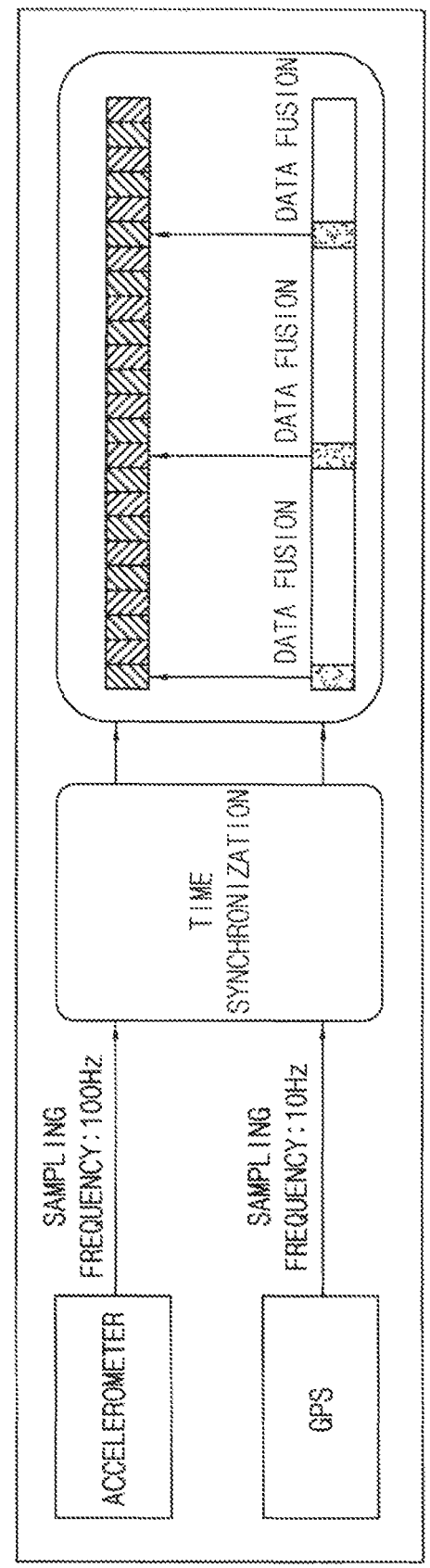

FIGS. 1 to 3 illustrate a precise measurement system for a structure according to an example embodiment. FIGS. 4 to 9 are diagrams for describing an operation processor included in the precise measurement system for the structure according to an example embodiment.

Referring to FIGS. 1 to 9, a precise measurement system for the structure according to the example embodiment may include a reference meter 110, a plurality of response meters 120, an operation processor 130, a communication network 140, and the like.

The reference meter 110 may be installed at a fixed location and may provide GPS reference information received via a reference GPS module 112. The reference meter 110 may include a reference GPS module 112, a first communication module 114, and the like.

The reference meter 110 may receive satellite signals from a plurality of satellites via the reference GPS module 112 to generate and transmit GPS reference information to each of the plurality of response meters 120 via the first communication module 114. Here, the GPS reference information may include reference position data, reference time data, and the like.

The plurality of response meters 120 may include an acceleration sensor 121 and a response GPS module 125 and be installed at a plurality of positions of the structure, respectively. The plurality of response meters 120 may transmit acceleration information obtained from the acceleration sensor 121 and a plurality of RTK displacement data measured by the response GPS module 125 using the GPS reference information.

The plurality of response meters 120 may acquire acceleration information by measuring an X-axis component, a Y-axis component, and a Z-axis component of the acceleration of the structure using the acceleration sensor 121, and assign corresponding acceleration time information to the acceleration information using the GPS reference information (e.g., reference time data, etc.).

In addition, the plurality of response meters 120 may acquire a plurality of RTK displacement data corresponding to the installation positions using the satellite signals received from the plurality of satellites via the response GPS module 125, and GPS reference information. Also, the plurality of response meters 120 may assign corresponding time information to respective relative displacement data respectively while measuring the three-axis relative displacement of the satellite signals based on the GPS reference information (e.g., reference position data, reference time data, etc.).

The plurality of response meters 120 synchronize acceleration time information corresponding to the acceleration information with displacement time information corresponding to the RTK displacement information. Thereafter, the plurality of response meters 120 may convert the result of the synchronization into a single packet and transmit the packet to the operation processor 130 through the communication network 140.

The plurality of response meters 120 may synchronize the acceleration information with the RTK displacement information at a multiple sampling frequency. In addition, synchronization of the entire system may be established based on one reference meter 110.

As described above, the plurality of response meters 120 may include, in addition to the acceleration sensor 121, a temperature sensor 122, an AD converter 123, a data processor 124, a response GPS module 125, a second communication module 126, and the like.

Here, the acceleration sensor 121 may be a force feedback type sensor. The acceleration sensor 121 may sense an X-axis component, a Y-axis component, and a Z-axis component of an acceleration at an installation position where each of the response meters 120 is installed, and transmits a sensing signal to the AD converter 123.

Here, the sensing signal may include acceleration data corresponding to the X-axis, Y-axis, and Z-axis, angular displacement data corresponding to the XY plane, YZ plane, and ZX plane, etc. The acceleration data may include X-axis direction acceleration data, Y-axis direction acceleration data, and Z-axis direction acceleration data between a first position corresponding to a first time and a second position corresponding to a second time after a predetermined time elapses at the installation position. The angular displacement data about the first position may include XY angular displacement data varying along the XY plane, YZ angular displacement data varying along the YZ plane, and ZX angular displacement data varying along the ZX plane.

This acceleration sensor 121 may have a measurement frequency bandwidth of 0 Hz to 100 Hz and a measurement resolution of approximately 1 μG for large structure measurements. The sensing signal may be converted from an analog signal to a digital signal at a sampling frequency of approximately 100 Hz by the AD converter 123.

In addition, the temperature sensor 122 may sense a temperature inside the meter and transmit the signal sensed to the AD converter 123. Since various kinds of temperature sensors 122 such as a contact type temperature sensor, a non-contact type sensor, and the like have been already disclosed, a detailed description thereof will be omitted.

The AD converter 123 may convert the analog sensing signal transmitted from the acceleration sensor 121 into a digital signal and transmit the digital signal to the data processor 124. The AD converter 123 may convert an analog temperature signal transmitted from the temperature sensor 122 into a digital signal and transfer the digital signal to the data processor 124.

The data processor 124 may assign acceleration time information to acceleration information transferred from the AD converter 123 using GPS reference information (for example, reference time data, etc.) transmitted through the second communication module 126. The data processor 124 may synchronize the acceleration information with a plurality of RTK displacement data transmitted from the response GPS module 125 at a multiple sampling frequency. In addition, the data processor 124 may generate a packet using the acceleration information (e.g., acceleration data corresponding to the X-axis, Y-axis and Z-axis, angular displacement data corresponding to the XY plane, YZ plane and ZX plane, acceleration time data, etc.) and a plurality of RTK displacement data (e.g., dynamic displacement data corresponding to the X-axis, Y-axis and Z-axis, displacement time data, etc.) and transmit the packet data to the operation processor 130 through the second transmission module 125.

For example, when a sampling frequency of the acceleration information is 100 Hz and a sampling frequency of the RTK displacement information is 10 Hz, the data processor 124 may synchronize the acceleration information and the RTK displacement information so that the acceleration information and RTK displacement information data can be fused.

Further, the data processor 124 may perform correction of the acceleration information according to the temperature change by using temperature data corresponding to the sensing signal transmitted from the AD converter 123. For example, since the measurement value from the acceleration sensor 121 may be variable in accordance with the temperature change, the temperature correction may be required. When measuring only the acceleration sensor using a separate sensor measurement device, its output voltage may vary up and down in the morning and afternoon. The data processor 124 may correct the acceleration information by calculating a correction value according to the temperature change.

This temperature data may be transmitted to the operation processor 130 via the second communication module 126 as additional meter information. The temperature data may be generated and transmitted as one packet together with the acceleration information and the plurality of RTK displacement data as described above.

On the other hand, the response GPS module 125 may receive satellite signals corresponding to its installation position from a plurality of satellites. The response GPS module 125 also may calculate a plurality of RTK displacement data (e.g., dynamic displacement data corresponding to the X-axis, the Y-axis, and the Z-axis, etc.) corresponding to the installation location using the GPS reference information transmitted through the second communication module 126 and the satellite signals received. This response GPS module 125 may acquire spatial coordinates with a precision of several centimeters at a sampling frequency of approximately 10 Hz and convert them into a three DOF displacement.

That is, the response GPS module 125 may measure the three-axis relative displacements of the satellite signals based on the GPS reference information (e.g., reference position data, reference time data, etc.) and assign corresponding displacement time information (i.e., the displacement time data) to the respective relative displacement data. The plurality of RTK displacement data (e.g., dynamic displacement data corresponding to the X-axis, Y-axis, and Z-axis, displacement time data, etc.) may be transmitted to the data processor 124.

For example, RTK displacement information at a time of 10 h:11 m:12.5 s may be generated using position data at the time of 10 h:11 m:12.5 s in the reference GPS information and position data at the time 10 h:11 m:12.5 s in the satellite signals.

A more detailed description will be given of the plurality of RTK displacement data (e. g., dynamic displacement data corresponding to the X-axis, Y-axis and Z-axis, displacement time data, etc.) described above. The displacement generated by integrating the acceleration may have cumulative errors due to integration of the bias. According to in the present disclosure, however, there is no cumulative error. Since the cumulative error does not occur, an origin correction effect may be obtained with respect to the displacement generated by the acceleration integration.

The acceleration information acquired by the acceleration sensor 121 as described above may be provided as three DOF acceleration data with a relatively high precision and a relatively high sampling frequency and three DOF angular displacement data with a relatively low precision and a relatively high sampling frequency. The plurality of RTK displacement data obtained through the response GPS module 125 may be provided as three DOF dynamic displacement data with a relatively low precision and relatively low sampling frequency.

The operation processor 130 may calculate structure response information using the acceleration information and the plurality of RTK displacement data received from the communication network 140. The operation processor 130 may compute the three DOF acceleration and three DOF angular displacement of the time-synchronized acceleration information, and the three DOF dynamic displacement of the RTK displacement information using a first-stage Kalman filter and a second-stage Kalman filter to remove the displacement error corresponding to an acceleration-internal bias in the acceleration, thereby obtain structure response information for the structure. Here, the operation processor 130 may calculate a first displacement including the acceleration-internal bias through the first-stage Kalman filter, and calculate a displacement error of the calculated first displacement through the second-stage Kalman filter. Thereafter, the structure response information may be obtained by removing the displacement error from the first displacement.

The operation processor 130 may provide the acceleration information and the plurality of RTK displacement data as well as the calculated structure response information to a separate display device (not shown) to be comparably displayed.

The operation processor 130 as described above may calculate the first displacement and the displacement error through the first-stage Kalman filter and the second-stage Kalman filter, respectively. Then, the operation processor 130 may calculate the structure response information (e.g., acceleration data, velocity data, displacement data, angular displacement data, etc.) by removing the displacement error from the first displacement.

The data processing using the first-stage Kalman filter and the second-stage Kalman filter will be described in more detail. The first-stage Kalman filter may be used to calculate the first displacement including the acceleration-internal bias. If the current time is (k−1) in the preprocessing process, the prior displacement data $\tilde{x}^-(k)$ at a next time k may be predicted as Equation (1) below by using the corrected displacement data $\tilde{x}^+(k-1)$ at a current time k−1. Note that transition matrix A refers the relation between the prior displacement data $\tilde{x}^-(k)$ at time k and the corrected displacement data $\tilde{x}^+(k-1)$ at time k−1.

$$\tilde{x}^-(k)=A\tilde{x}^+(k-1) \tag{1}$$

A prior statistical error $\tilde{P}_k^-(k)$ generated in predicting the displacement data at the next time using a posterior statistical error $P_x(k-1)$ of the displacement data at the current time may be calculated as shown in the following Equation (2). Note that the matrix Q(k) refers the covariance of process noise, the matrix B refers transition matrix of process noise and $B^T$ means transpose of the matrix B.

$$\tilde{P}_x^-(k)=AP_x(k-1)A^T+Q(k)BB^T \tag{2}$$

On the other hand, if the current time is k in the post-processing, a correction weight $\tilde{K}_x(k)$ may be calculated by using an acceleration and a noise R(k) of the measurement data at the current time k and a prior statistical error $\tilde{P}_x^-(k)$ at the current time k as shown in Equation (3) below. Note that observation matrix H refers the relation between the displacement measurement data y(k) and the corrected displacement data $\tilde{x}^+(k)$.

$$\tilde{K}_x(k)=\tilde{P}_x^-(k)H^T[H\tilde{P}_x(k)H^T+R(k)]^{-1} \tag{3}$$

A corrected displacement data $\tilde{x}^+(k)$ at the current time may be calculated as shown in Equation (4) below by applying the correction weight $\tilde{K}_x(k)$ to the difference between the acceleration and displacement measurement data y(k) at the current time and the prior displacement data $\tilde{x}^-(k)$ at the current time, and correcting the prior displacement data $\tilde{x}^-(k)$ at the current time.

$$\tilde{x}^+(k)=\tilde{x}^-(k)+\tilde{K}_x(k)[y(k)-H\tilde{x}^-(k)] \tag{4}$$

On the other hand, a displacement error included in the first displacement calculated through the first-stage Kalman filter may be calculated using the second-stage Kalman filter. If the current time is k−1 in the pre-processing, an acceleration-internal bias $\hat{b}^-(k)$ at the next time may be predicted as Equation 5 below using the acceleration-internal bias b $\hat{b}^+(k-1)$ at the current time.

$$\hat{b}^-(k)=\hat{b}^+(k-1) \tag{5}$$

Then, an acceleration-internal bias influence coefficient correction amount S(k) at the next time may be predicted as shown in Equation (6) using the acceleration-internal bias influence coefficient V(k−1) at the current time. In Equation (6), C may be a constant.

$$S(k)=HAV(k-1)+C \tag{6}$$

The acceleration-internal bias influence coefficient V(k) at the next time may be predicted as shown in Equation (7) below using the acceleration-internal bias influence coefficient V(k−1) at the current time, the correction weight $\tilde{K}_x(k)$ of the above Equation (3), and the acceleration-internal bias influence coefficient correction amount S(k) at the next time.

$$V(k)=AV(k-1)-\tilde{K}_x(k)S(k) \tag{7}$$

Meanwhile, if the current time is k in the post-processing, an acceleration-internal bias correction weight $K_b(k)$ may be predicted as shown in Equation (8) below using the prior statistical error $\tilde{P}_x^-(k)$ of Equation (2), the acceleration-internal bias influence coefficient correction amount S(k) at the current time, and the error covariance matrix of the prior estimation of $\hat{b}^-(k)$, $P_b^-(k)$.

$$K_b(k)=P_b^-(k)S(k)^T[H\tilde{P}_x^-(k)H^T+S(k)P_b^-(k)S(k)^T+R(k)] \tag{8}$$

Next, a corrected acceleration-internal bias $\hat{b}^+(k)$ at the current time may be calculated as Equation 9 below by applying the correction weight $K_b(k)$ to the difference between the measurement data y(k) at the current time and the acceleration-internal bias $\hat{b}^-(k)$ at the current time and correcting the acceleration-internal bias $\hat{b}^-(k)$ at the current time. Note that $\tilde{x}^-(k)$ refers the prior estimation of acceleration-internal bias considered displacement data.

$$\hat{b}^+(k)=\hat{b}^-(k)+K_b(k)[y(k)-H\tilde{x}^-(k)-C\hat{b}^-(k)] \tag{9}$$

Subsequently, displacement data from which an error due to the bias is removed for error correction may be obtained as Equation (10) below by multiplying the acceleration internal bias $\hat{b}^+(k)$ corrected as Equation (9) by the acceleration-internal bias influence coefficient V(k) at the current time as Equation (7), and combining a result value of the multiplication with the corrected displacement data $\tilde{x}^+(k)$ obtained by the first-stage Kalman filter as Equation (4).

$$\hat{x}^+(k)=\tilde{x}^+(k)+V(k)\hat{b}^+(k) \tag{10}$$

Figure 5:
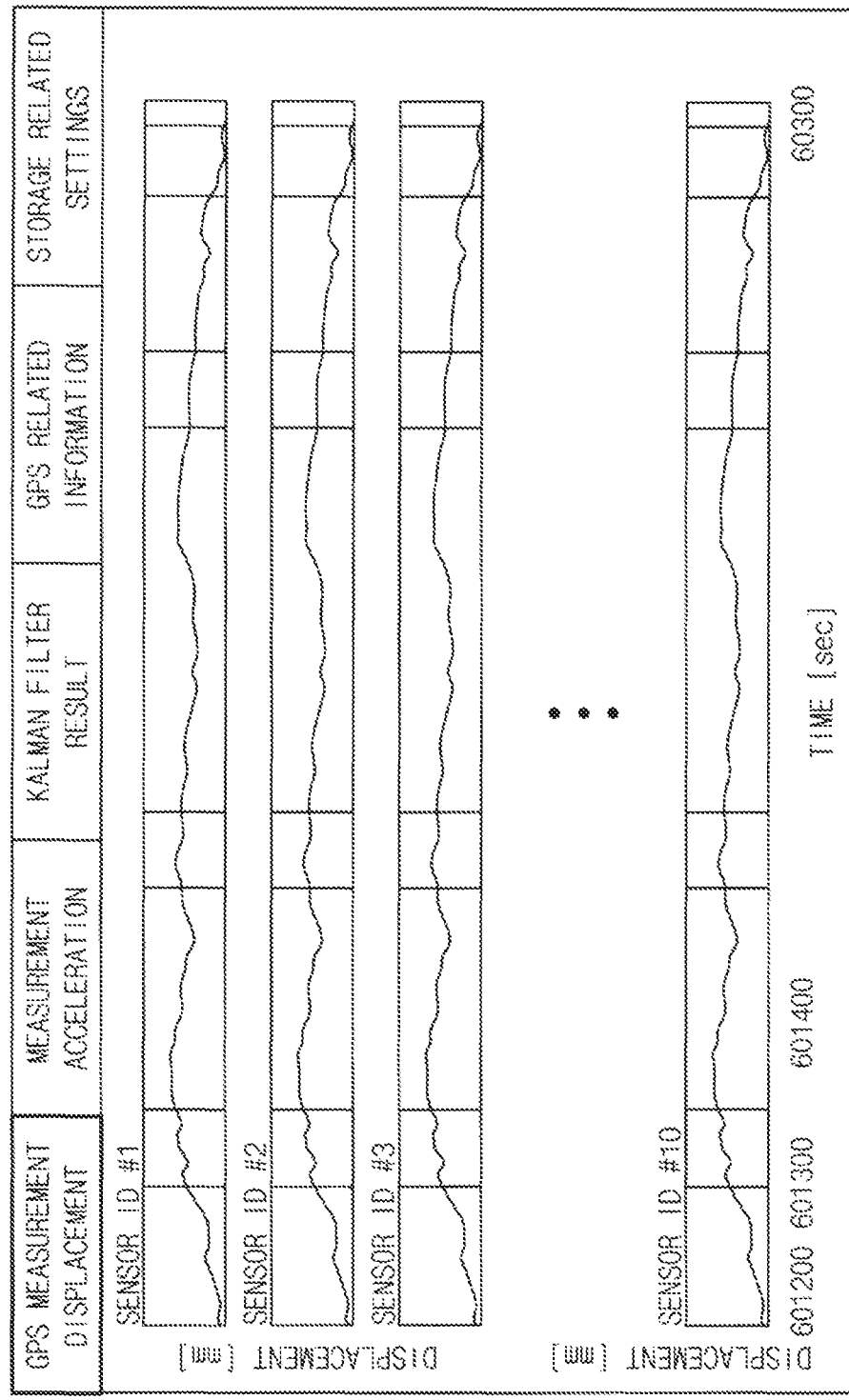
Figure 6:
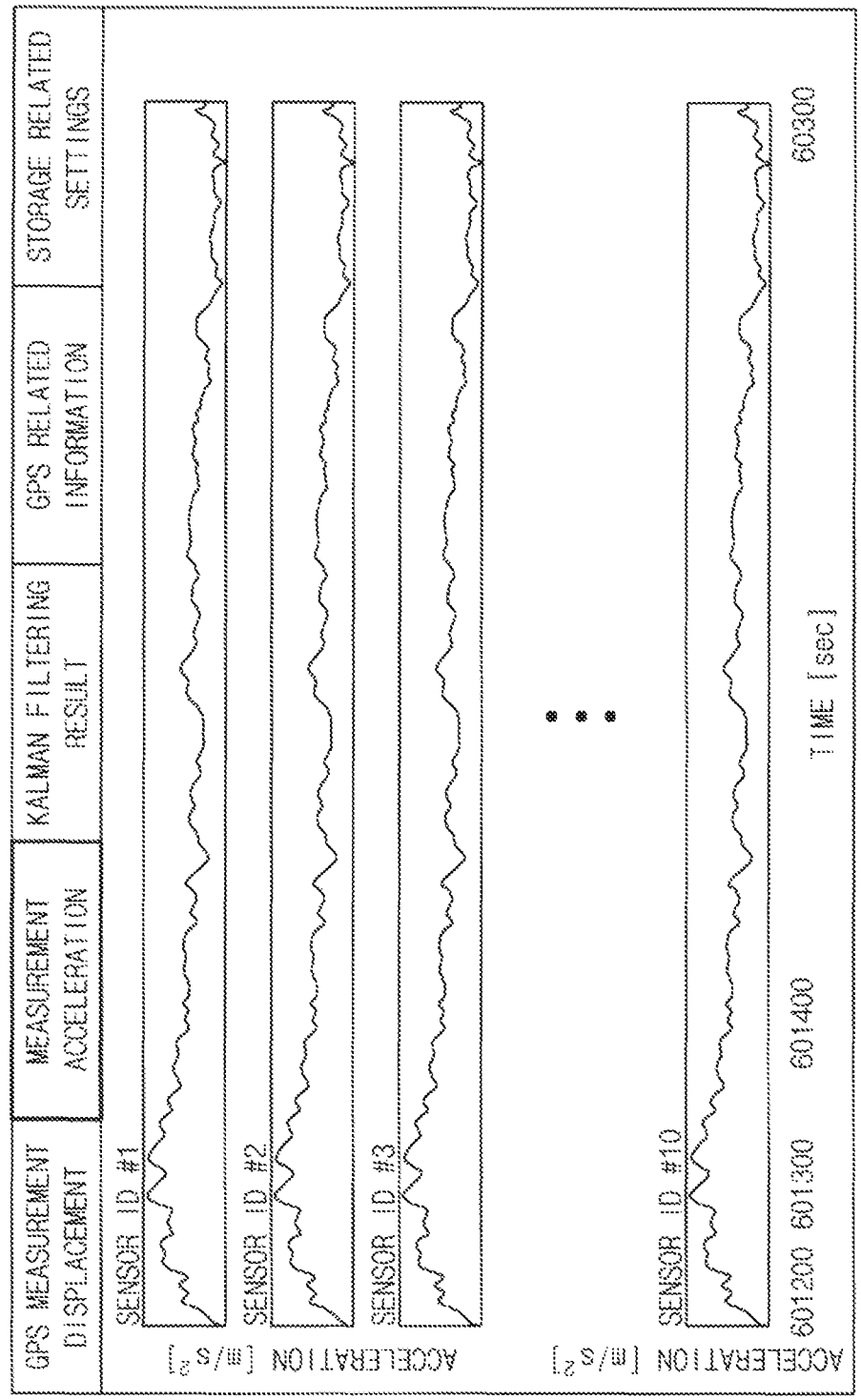

The operation processor 130 as described above may make both of the plurality RTK displacement transmitted and the structure response information calculated to be comparatively displaced on the separate display device (not shown). As shown in FIG. 5, a plurality of RTK displacement data (that is, shown as GPS measurement displacement) transmitted from each of the plurality of response meters 120 may be respectively displayed. As shown in FIG. 6, the acceleration information transmitted from each of the plurality of response meters 120 (i.e., measured acceleration) may be displayed.

Figure 7:
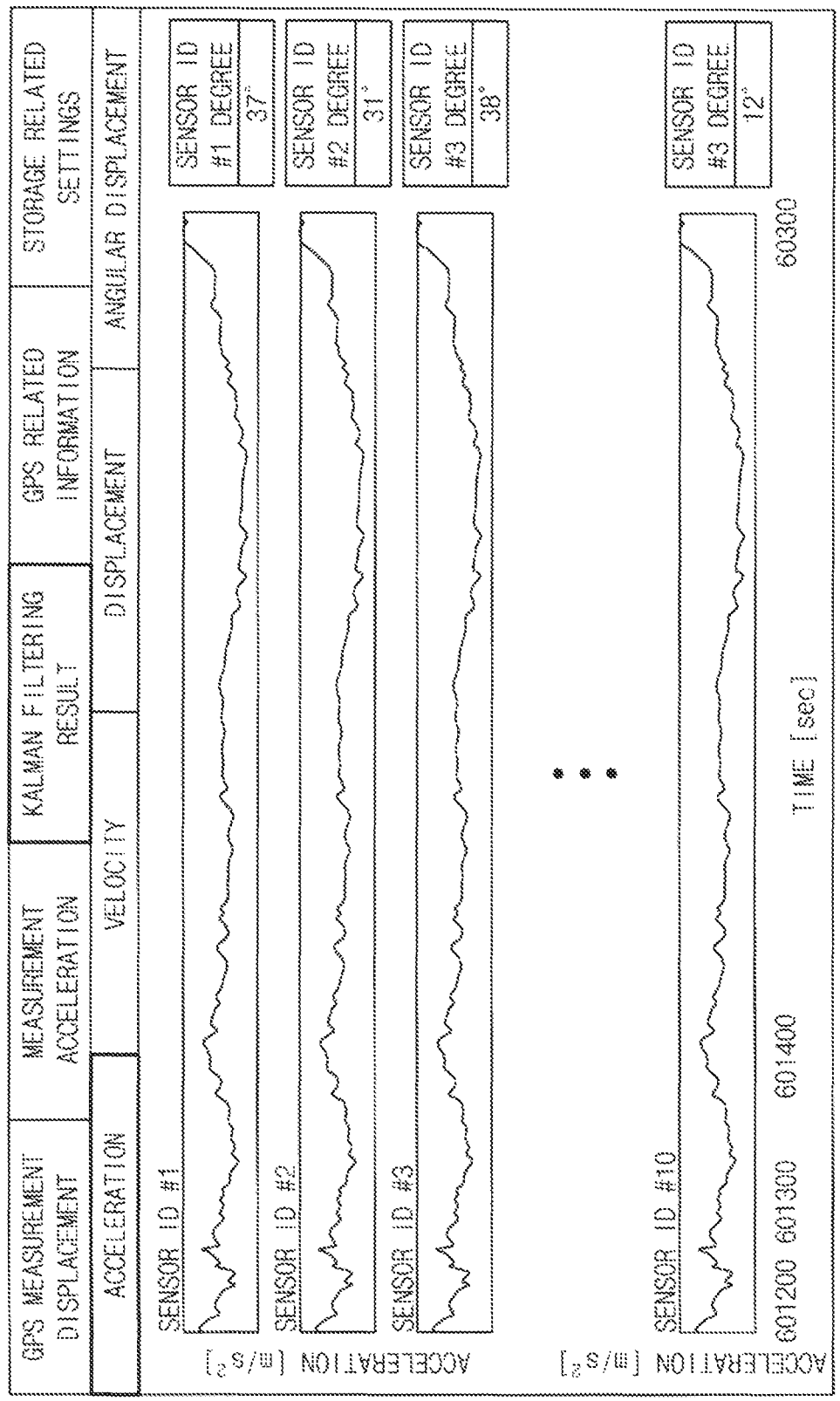

As shown in FIG. 7, the operation processor 130 may make the structure response information (i.e., shown as Kalman filtering results), obtained by combining the acceleration information with the RTK displacement information through the first-stage Kalman filter and the second-stage Kalman filter, be displayed respectively. Here, the structure response information may include acceleration data, velocity data, displacement data, and angular displacement data each of which may be separately displayed. A warp-off angle of the filter used in the Kalman filtering may be set to an input value.

In FIGS. 5, 6 and 7 described above, a window ranged 60 seconds may be successively shifted along the X-axis, and a range of the Y-axis may be set in correspondence with the maximum amplitude within the window.

In addition, the operation processor 130 may display GPS-related information (e.g., the number of GPS satellites, mode information, integer ambiguity information, and the like) regarding the state of the GPS data per sensor as shown in FIG. 8. In addition, as shown in FIG. 9, a path for storing result data (i.e., structure response information) derived through the Kalman filter may be set and stored. Here, 'true' in the item of 'Save' means to save.

The operation processor 130 may perform individual Kalman filtering operations on the respective acceleration information and the RTK displacement information in real time, and may visually display and store the structure response information (e.g., acceleration data, velocity data, displacement data, angular displacement data, etc.) obtained from the Kalman filtering operations.

For example, if there are ten acceleration sensors, ten sets of acceleration data and displacement RTK data may be transmitted, and ten Kalman filter algorithms may be operated individually to yield ten precise displacement data. Each of these precise displacement data is structure response information corresponding to the installation positions.

The communication network 140 may include a wired communication network, and/or a wireless communication network. The communication network 140 may provide a wired and/or a wireless communication environment between the reference instrument 110, the plurality of response meters 120, and the operation processor 130, and thus may transmit and receive data therebetween.

Therefore, the present disclosure may provide a precise measurement system that may precisely measure the dynamic behavior of a structure including high-rise buildings, bridges, dams, harbors, etc. using the GPS and the accelerometer.

Further, a system for precisely measuring a structure according to an embodiment of the present disclosure may include a reference meter installed at a fixed position and configured to provide GPS reference information, a plurality of response meters installed at a plurality of positions of the structure and configured to measure displacement information corresponding to the installation positions, respectively, and an operation processor configured to receive respective displace information from the plurality of response meters through a communication network and calculate structure response information. The system may precisely measure dynamic characteristics of the structure including acceleration, velocity, displacement, angular displacement.

Furthermore, the system for precision measurement according to an example embodiment may provide solutions for the synchronization, integration, and compatibility of data by measuring the six DOF dynamic characteristics of the structure including acceleration, velocity, displacement, angular displacement, etc. The system may not only respond to the low vibration of several micro-Gs in the low frequency response characteristics of the structure but also constantly measure the change due to the temperature change depending on presence or absence of wind, sunlight, and the like.

Next, with the precise measurement system having the above-described configuration, the following processing may be performed: the reference meter installed at a fixed position provides the GPS reference information; the plurality of response meters installed at a plurality of positions of the structure respectively transmit acceleration information obtained through the acceleration sensors; the plurality of response meters transmit the plurality of RTK displacement data measured by using GPS reference information; and the operation processor receives the acceleration information and the plurality of RTK displacement data to calculate the structure response information. This processing will be described below.

Figure 10:
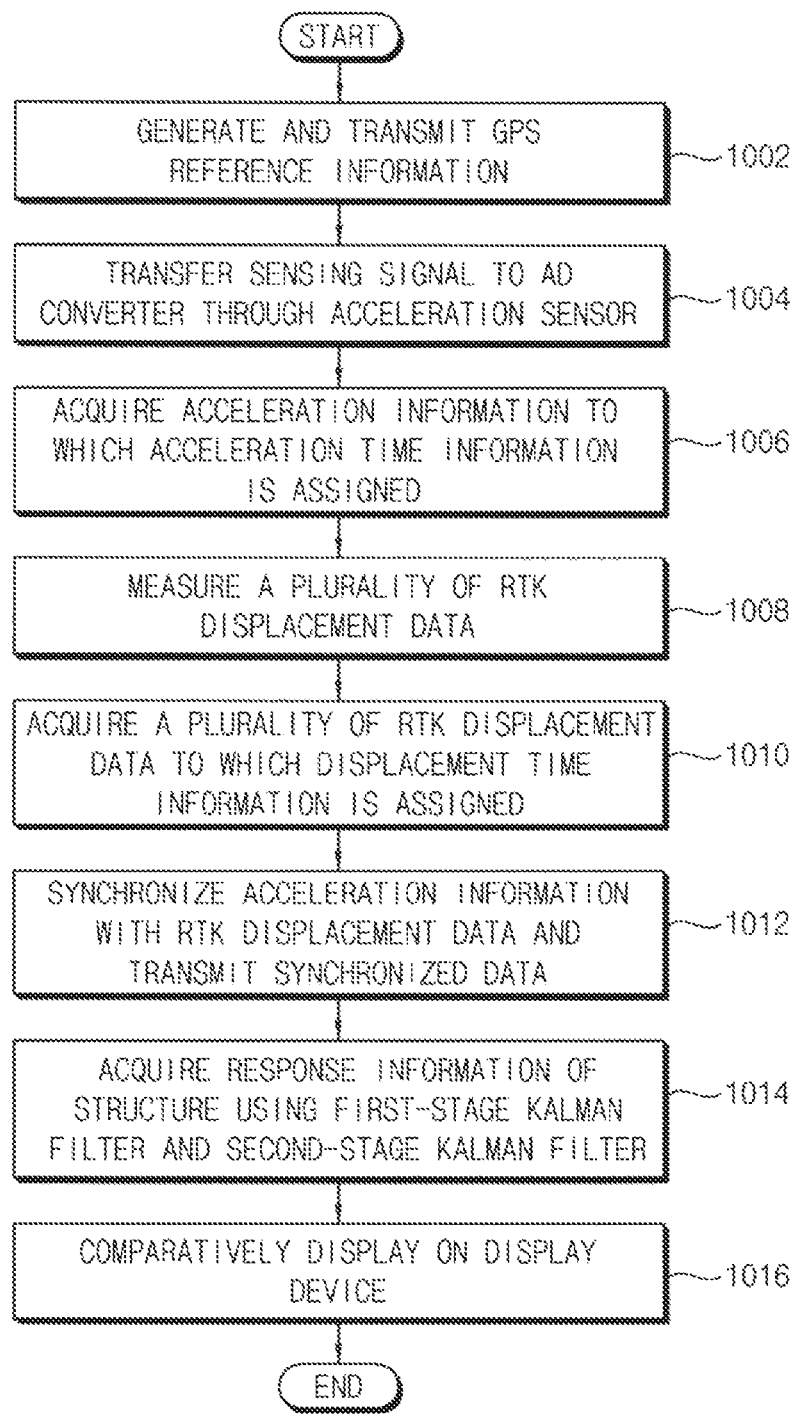
FIG. 10 is a flowchart showing a process of accurately measuring the dynamic behavior of a structure according to other embodiments of the present disclosure.

FIG. 10 is a flowchart showing steps of precisely measuring the dynamic behaviors of the structure according to another embodiment of the present disclosure.

Referring to FIG. 10, the reference meter 110 may receive satellite signals from a plurality of satellites through the reference GPS module 112 to generate GPS reference information, and then transmit the GPS reference information to the plurality of response meters 120 through the first communication module 114, respectively (Step 1002). Here, the GPS reference information may include reference position data, reference time data, and the like.

Each of the plurality of response meters 120 installed at the plurality of positions of the structure may respectively sense the X-axis component, the Y-axis component, and the Z-axis component of the acceleration with respect to the structure at its installation position via the acceleration sensor 121, and transfer the sensing signal to the AD converter 123 (step 1002). Here, the sensing signal may include acceleration data corresponding to the X-axis, the Y-axis and the Z-axis, angular displacement data corresponding to the XY plane, the YZ plane and the ZX plane, and the like. The acceleration data may include X-axis direction acceleration data, Y-axis direction acceleration data, and Z-axis direction acceleration data in the installation position between a first position corresponding to a first time and a second position corresponding to a second time after a predetermined time elapses from the first time. The angular displacement data may include XY angular displacement data varying along the XY plane, YZ angular displacement data varying along the YZ plane, and ZX angular displacement data varying along the ZX plane about the first position.

The AD converter 123 may convert the sensing signal transmitted from the acceleration sensor 121 into a digital signal and transmits the digital signal to the data processor 124. The data processor 124 may assign the acceleration time information to the acceleration information transmitted from the AD converter 124 using the GPS reference information (e.g., reference time data, etc.) transmitted through the second communication module 125. The data processor 124 in this manner may acquire acceleration information (e.g., acceleration data corresponding to the X axis, Y axis and Z axis, angular displacement data corresponding to the XY plane, YZ plane and ZX plane, acceleration time data, etc.) (Step 1006).

Meanwhile, each of the plurality of response meters 120 installed at several positions of the structure may receive a satellite signal corresponding to the corresponding installation position through the response GPS module 125 from a plurality of satellites, and measure the plurality RTK displacement information (e.g., dynamic displacement data corresponding to the X-axis, Y-axis, and Z-axis, etc.) corresponding to the installation position using the GPS reference information transmitted through the second communication module 124 and the satellite signals received (Step 1008).

The response GPS module 125 may measure the three-axis relative displacements of the satellite signals based on the GPS reference information (e.g., reference position data, reference time data, etc.) and assign the corresponding displacement time information (i.e., displacement time data) to each of the relative displacement data. In this manner, a plurality of RTK displacement data (e.g., dynamic displacement data corresponding to the X-axis, Y-axis and Z-axis, displacement time data, etc.) may be obtained (step 1010). The plurality of RTK displacement data may be transmitted to the data processor 124 for the time synchronization.

In the next, the data processor 124 may synchronize the acceleration information to which the acceleration time information is assigned with the plurality of RTK displacement data transmitted from the response GPS module 125 at multiple sampling frequencies. The data processor 124 may also generate the acceleration information (e.g., acceleration data corresponding to the X-axis, Y-axis and Z-axis, angular displacement data corresponding to the XY plane, YZ plane and ZX plane, acceleration time data, etc.) and the plurality of RTK displacement data (e.g., dynamic displacement data corresponding to the X-axis, Y-axis, and Z-axis, displacement time data, and the like) in a form of one packet to be transmitted to the operation processor 130 through the second communication module 125 (Step 1012).

Here, the data processor 124 may perform the correction of the acceleration information according to the temperature change using the temperature data corresponding to the sensing signal sensed through the temperature sensor 122. The data processor 124 may transmit the temperature data together with the acceleration information and the plurality of RTK displacement data as one packet to the operation processor 130.

Then, the operation processor 130 may receive three DOF acceleration and three DOF angular displacement of the acceleration information and three DFO dynamic displacement of the RTK displacement information transmitted in one packet from each of the plurality of response meters 120, and perform the operations of the first-stage Kalman filtering and the second-stage Kalman filtering to remove the displacement error corresponding to the acceleration-internal bias. By these operations, the structure response information for the structure may be obtained (step 1014). Here, a first displacement including the acceleration-internal bias may be calculated through the first-stage Kalman filtering, and a displacement error included in the first displacement may be calculated through the second-stage Kalman filtering. Thereafter, the structure response information can be calculated by removing the displacement error from the first displacement.

The operation processor 130 may comparatively display the acceleration information and the plurality of RTK displacement data received, and the structure response information calculated on a separate display device (step 1016). For example, displayed on the display device are the plurality of RTK displacement data (shown as 'GPS MEASUREMENT DISPLACEMENT') as shown in FIG. 5, the acceleration information (shown as 'MEASUREMENT ACCELERATION') as shown in FIG. 6, the structure response information (shown as 'KALMAN FILTER RESULT') as shown in FIG. 7, the GPS related information (e.g., the number of GPS satellites, the mode information, the integer ambiguity information and the like) as shown in FIG. 8, the storage path setting as shown in FIG. 9.

Therefore, according to the present disclosure it is possible to provide a method of precisely measuring the dynamic behaviors of a structure such as high-rise buildings, bridges, dams, harbors, etc. using the GPS and the accelerometer.

Also, the system according to the present disclosure includes the reference meter installed at a fixed location and configured to provide the GPS reference information, the plurality of response meters installed respectively at a plurality of positions on the structure and configured to measure the displacement information corresponding to the installation position; and the operation processor configured to respectively receive the displacement information from the plurality of response meters via the communication network and calculate the structure response information, thereby precisely measuring the dynamic characteristics of the structure including acceleration, velocity, displacement, angular displacement, etc.

Although a few embodiments of the present general inventive concepts have been shown and described, it is not to be construed as limiting the present disclosure. It will be appreciated by those skilled in the art that various substitutions, modifications, and changes may be made in these embodiments without departing from the principles and spirit of the general inventive concepts, the scope of which is defined in the appended claims and their equivalents.

What is claimed is:

1. A system for precisely measuring a structure, comprising:
a reference meter installed at a fixed position and configured to provide GPS reference information received via a reference GPS module,
a plurality of response meters, installed at a plurality of positions of the structure respectively, each of which comprises an acceleration sensor and a response GPS module, and is configured to synchronize acceleration information obtained through the acceleration sensor with a plurality of real-time kinematic (RTK) displacement data measured through the response GPS module using the GPS reference information to transmit the synchronized acceleration information and the plurality of RTK displacement data, and
an operation processor configured to calculate structure response information using the transmitted acceleration information and the plurality of RTK displacement data,
wherein the GPS reference information includes reference position data and reference time data, and the plurality of RTK displacement data include dynamic displacement data corresponding to X-axis, Y-axis, and Z-axis and displacement time data, and
wherein the response meter acquires the acceleration information by measuring an X-axis component, a Y-axis component, and a Z-axis component of an acceleration of the structure through the acceleration sensor, and synchronizes acceleration time data corresponding to the acceleration information with the displacement time data at multi-sampling frequencies to generate the acceleration information and the plurality of RTK displacement data into a packet, the acceleration information including acceleration data corresponding to an X-axis, a Y-axis, and a Z-axis, and angular displacement data corresponding to an XY plane, a YZ plane, and a ZX plane.

2. The system of claim 1, wherein the response meter is configured to acquire the plurality of RTK displacement data corresponding to installation positions using satellite signals and the GPS reference information which are received from the plurality of satellites via the response GPS module.

3. The system of claim 2, wherein the response meter is configured to measure three-axis relative displacements of the satellite signals based on the GPS reference information and assign corresponding displacement time information to respective relative displacement data.

4. The system of claim 1, wherein the response meter is configured to assign corresponding acceleration time information to the acceleration information based on the GPS reference information.

5. The system of claim 4, wherein the response meter is configured to perform correction of the acceleration information according to temperature change based on temperature data measured by a temperature sensor that senses a temperature inside the response meter.

6. The system of claim 1, wherein the operation processor is configured to calculate a three-DOF acceleration and a three-DOF angular displacement of the acceleration information and a three-DOF dynamic displacement of the RTK displacement data using a first-stage Kalman filter and a second-stage Kalman filter so that a displacement error corresponding to an acceleration-internal bias is eliminated.

7. The system of claim 6, wherein the operation processor is configured to calculate a first displacement including the acceleration-internal bias through the first-stage Kalman filter.

8. The system of claim 7, wherein the calculation processor is configured to calculate the displacement error included in the first displacement through the second-stage Kalman filter, and then remove the displacement error from the first displacement to calculate the structure response information.

9. The system of claim 8, wherein the operation processor may be configured to comparatively display the acceleration information, the plurality of RTK displacement data, and the structure response information.

10. A method for precisely measuring a structure, comprising: providing GPS reference information by a reference meter installed at a fixed position; acquiring acceleration information from an acceleration sensor by a plurality of response meters respectively installed at a plurality positions of the structure; measuring a plurality of RTK displacement data based on the GPS reference information by the plurality of response meters, respectively; synchronizing the acceleration information and the plurality of RTK displacement data to transmit the synchronized acceleration information and RTK displacement data by the plurality of response meters; and receiving the acceleration information and the plurality of RTK displacement data and calculating structure response information by an operation processor; wherein the GPS reference information includes reference position data and reference time data, and the plurality of RTK displacement data includes dynamic displacement data corresponding to X-axis, Y-axis, and Z-axis and displacement time data, wherein in acquiring the acceleration information, the acceleration information is acquired by measuring an X-axis component, a Y-axis component, and a Z-axis component of an acceleration of the structure through the acceleration sensor, where the acceleration information include acceleration data corresponding to an X-axis, a Y-axis, and a Z-axis, and angular displacement data corresponding to an XY plane, a YZ plane, and a ZX plane, and wherein in synchronizing the acceleration information and the plurality of RTK displacement data, the acceleration time data corresponding to the acceleration information are synchronized with the displacement time data at multi-sampling frequencies to generate the acceleration information and the plurality of RTK displacement data into a packet.

11. The method of claim 10, wherein in measuring the plurality of RTK displacement data, the plurality of RTK displacement data corresponding to installation positions is acquired using satellite signals and the GPS reference information which are received from the plurality of satellites via the response GPS module.

12. The method of claim 11, wherein in measuring the plurality of RTK displacement data, three-axis relative displacements of the satellite signals are measured based on the GPS reference information and corresponding displacement time information is assigned to respective relative displacement data.

13. The method of claim 10, wherein in acquiring acceleration information, corresponding acceleration time information is assigned to the acceleration information based on the GPS reference information.

14. The method of claim 13, wherein in synchronizing the acceleration information and the plurality of RTK displacement data, correction of the acceleration information is performed according to temperature change based on temperature data measured by a temperature sensor that senses a temperature inside the response meter, and then the time data is included into the packet to be transmitted.

15. The method of claim 10, wherein in calculating the structure response information, a three-DOF acceleration and a three-DOF angular displacement of the acceleration information, and a three-DOF dynamic displacement of the RTK displacement data are calculated using a first-stage Kalman filter and a second-stage Kalman filter so that a displacement error corresponding to an acceleration-internal bias is eliminated.

16. The method of claim 15, wherein in calculating the structure response information, a first displacement including the acceleration-internal bias is calculated through the first-stage Kalman filter.

17. The method of claim 16, wherein in calculating the structure response information, the displacement error included in the first displacement is calculated through the second-stage Kalman filter, and then the displacement error is removed from the first displacement to obtain the structure response information.

18. The method of claim 17, further comprising comparatively displaying the acceleration information, the plurality of RTK displacement data, and the structure response information after calculating the structure response information.

* * * * *